United States Patent
Price et al.

(10) Patent No.: US 11,430,217 B2
(45) Date of Patent: Aug. 30, 2022

(54) OBJECT OF INTEREST COLORIZATION

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US); Mikael Froejk Figueroa, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/119,752

(22) Filed: Dec. 11, 2020

(65) Prior Publication Data
US 2022/0188546 A1 Jun. 16, 2022

(51) Int. Cl.
| | |
|---|---|
| G06T 11/00 | (2006.01) |
| G06V 20/20 | (2022.01) |
| G06K 9/62 | (2022.01) |
| G06V 10/60 | (2022.01) |
| G06V 10/143 | (2022.01) |

(52) U.S. Cl.
CPC ............ G06V 20/20 (2022.01); G06K 9/628 (2013.01); G06K 9/6257 (2013.01); G06T 11/001 (2013.01); G06V 10/143 (2022.01); G06V 10/60 (2022.01)

(58) Field of Classification Search
CPC ............ G06K 9/00671; G06K 9/2018; G06K 9/4661; G06K 9/6257; G06K 9/628; G06T 11/001; G06N 3/02; G06N 3/08; G06V 20/20; G06V 10/60; G06V 10/143
See application file for complete search history.

(56) References Cited

U.S. PATENT DOCUMENTS

| | | | | |
|---|---|---|---|---|
| 9,139,133 B2 * | 9/2015 | Eng | ........................ | G08G 1/165 |
| 10,691,943 B1 * | 6/2020 | Ferstl | .................... | G06N 3/0445 |
| 10,819,923 B1 * | 10/2020 | McCauley | ............ | G01S 13/931 |

(Continued)

OTHER PUBLICATIONS

Kang, H., Zhou, H., & Chen, C. (Apr. 14, 2020). Visual perception and modeling for autonomous apple harvesting. IEEE Access, 8, 62151-62163. https://doi.org/10.1109/ACCESS.2020.2984556 (Year: 2020).*

(Continued)

*Primary Examiner* — Antonio A Caschera
(74) *Attorney, Agent, or Firm* — Alleman Hall Creasman & Tuttle LLP

(57) ABSTRACT

A method for image colorization includes receiving, from a camera, an input image including a plurality of input image pixels. One or more input interest pixels of the plurality of input image pixels are classified as corresponding to an object of interest. A display image is generated having a plurality of display image pixels each having pixel values based on relative temperature values of objects in a real-world environment, the display image pixels including display interest pixels corresponding to the input interest pixels. The display interest pixels are colorized with a color selected based on a recognized class of the object of interest to give a colorized display image, the selected color being independent of the relative temperature values of the object of interest. The colorized display image is displayed with the display interest pixels colorized with the selected color.

20 Claims, 8 Drawing Sheets

(56) References Cited

U.S. PATENT DOCUMENTS

| | | | | |
|---|---|---|---|---|
| 10,847,009 | B1* | 11/2020 | Sulucz | G08B 17/125 |
| 2019/0096135 | A1* | 3/2019 | Dal Mutto | G06T 7/50 |
| 2020/0005138 | A1 | 1/2020 | Wedig | |
| 2020/0143551 | A1* | 5/2020 | Gonzalez Aguirre | |
| | | | | G06K 9/00536 |
| 2021/0223557 | A1* | 7/2021 | Lamm | G02B 27/0093 |

OTHER PUBLICATIONS

Dai, et al., "Near Infrared Nighttime Road Pedestrians Recognition Based on Convolutional Neural Network", In Journal of Infrared Physics & Technology, vol. 97, Mar. 2019, pp. 25-32.

Fendri, et al., "Fusion of Thermal Infrared and Visible Spectra for Robust Moving Object Detection", In Journal of Pattern Analysis and Applications, vol. 20, Issue 4, Apr. 18, 2017, 20 Pages.

Gade, et al., "Thermal Cameras and Applications: A Survey", In Journal of Machine Vision and Applications, vol. 25, Issue 1, Nov. 9, 2013, pp. 245-262.

Liu, et al., "Deep Learning Thermal Image Translation for Night Vision Perception", In Journal of ACM Transactions on Intelligent Systems and Technology, vol. 12, Issue 1, Dec. 22, 2020, 18 Pages.

Liu, et al., "IR2VI: Enhanced Night Environmental Perception by Unsupervised Thermal Image Translation", In Proceedings of IEEE/CVF Conference on Computer Vision and Pattern Recognition Workshops (CVPRW), Jun. 18, 2018, pp. 1234-1241.

"International Search Report and Written Opinion Issued in PCT Application No. PCT/US21/057467", dated Mar. 9, 2022, 14 Pages.

Yang, et al., "Deep Transfer Learning for Military Object Recognition Under Small Training Set Condition", In Journal of Neural Computing and Applications, vol. 31, Issue 10, Apr. 10, 2018, pp. 6469-6478.

\* cited by examiner

200 ↴

```
┌─────────────────────────────────────────────────────────────┐
│ RECEIVE, FROM A CAMERA, AN INPUT IMAGE INCLUDING A PLURALITY │
│                   OF INPUT IMAGE PIXELS                      │
│                                                         202  │
└─────────────────────────────────────────────────────────────┘
                              │
                              ▼
┌─────────────────────────────────────────────────────────────┐
│ CLASSIFY, VIA A MACHINE-LEARNING TRAINED CLASSIFIER, ONE OR  │
│ MORE OF THE PLURALITY OF INPUT IMAGE PIXELS AS A SET OF INPUT│
│  INTEREST PIXELS CORRESPONDING TO AN OBJECT OF INTEREST      │
│                                                         204  │
└─────────────────────────────────────────────────────────────┘
                              │
                              ▼
┌─────────────────────────────────────────────────────────────┐
│  GENERATE A DISPLAY IMAGE INCLUDING A PLURALITY OF DISPLAY   │
│  IMAGE PIXELS CORRESPONDING TO THE PLURALITY OF INPUT IMAGE  │
│   PIXELS, AND INCLUDING A SET OF DISPLAY INTEREST PIXELS     │
│      CORRESPONDING TO THE SET OF INPUT INTEREST PIXELS       │
│                                                         206  │
└─────────────────────────────────────────────────────────────┘
                              │
                              ▼
┌─────────────────────────────────────────────────────────────┐
│  COLORIZE THE SET OF DISPLAY INTEREST PIXELS WITH A COLOR    │
│  SELECTED BASED ON A RECOGNIZED CLASS OF THE OBJECT OF       │
│                        INTEREST                              │
│                                                         208  │
└─────────────────────────────────────────────────────────────┘
                              │
                              ▼
┌─────────────────────────────────────────────────────────────┐
│ DISPLAY THE DISPLAY IMAGE WITH THE SET OF DISPLAY INTEREST   │
│       PIXELS COLORIZED WITH THE SELECTED COLOR               │
│                                                         210  │
└─────────────────────────────────────────────────────────────┘
```

FIG. 2

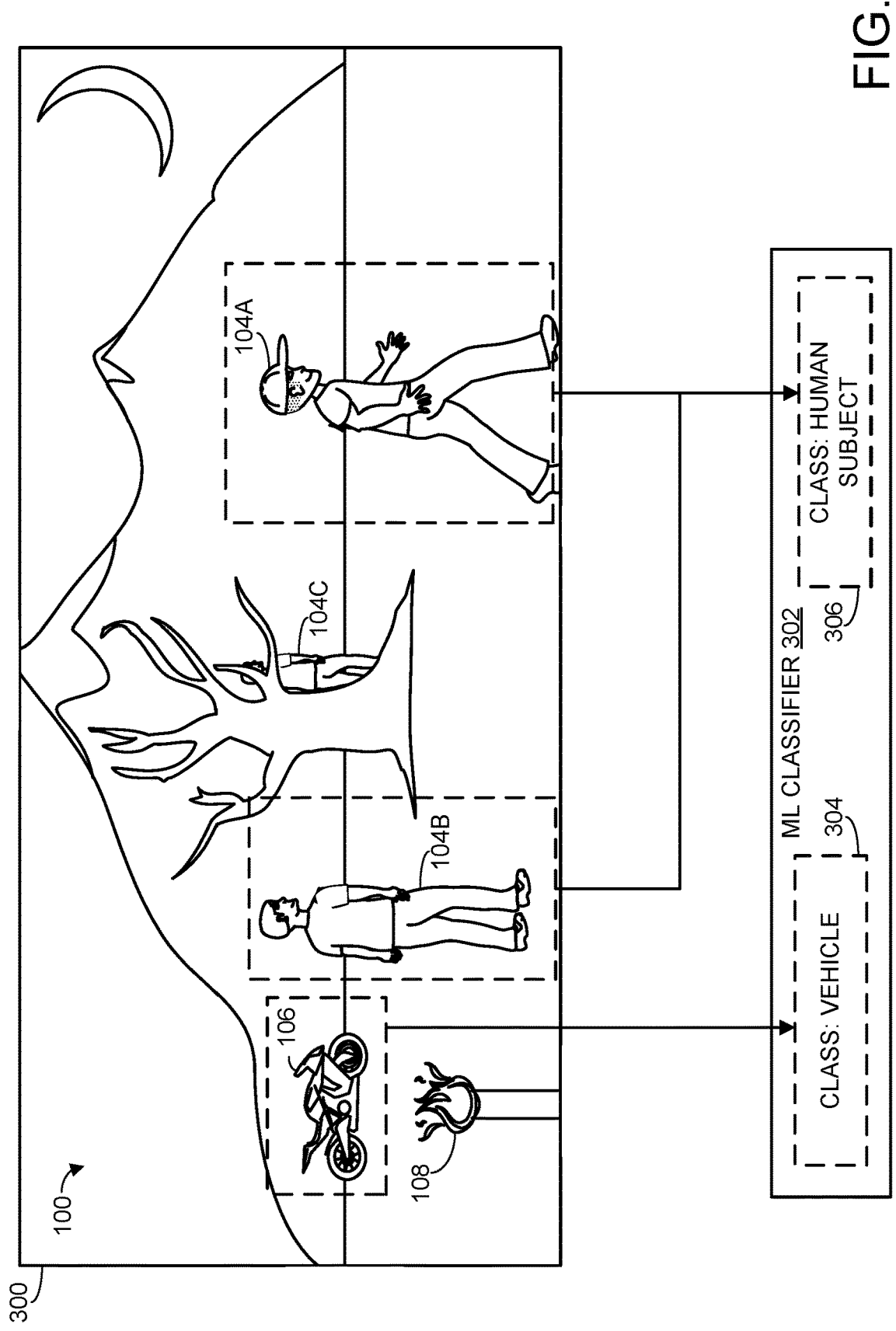

OBJECT OF INTEREST COLORIZATION

BACKGROUND

Relative temperatures of objects in an environment may be estimated from thermal images. Pixels of a thermal image may encode thermal intensity values that express relative amounts of thermal energy received by the thermal camera from objects in the environment.

BRIEF DESCRIPTION OF THE DRAWINGS

FIG. 2 illustrates an example method for image colorization.

FIG. 3 schematically illustrates classification of objects of interest in an input image.

DETAILED DESCRIPTION

Figure 1A:
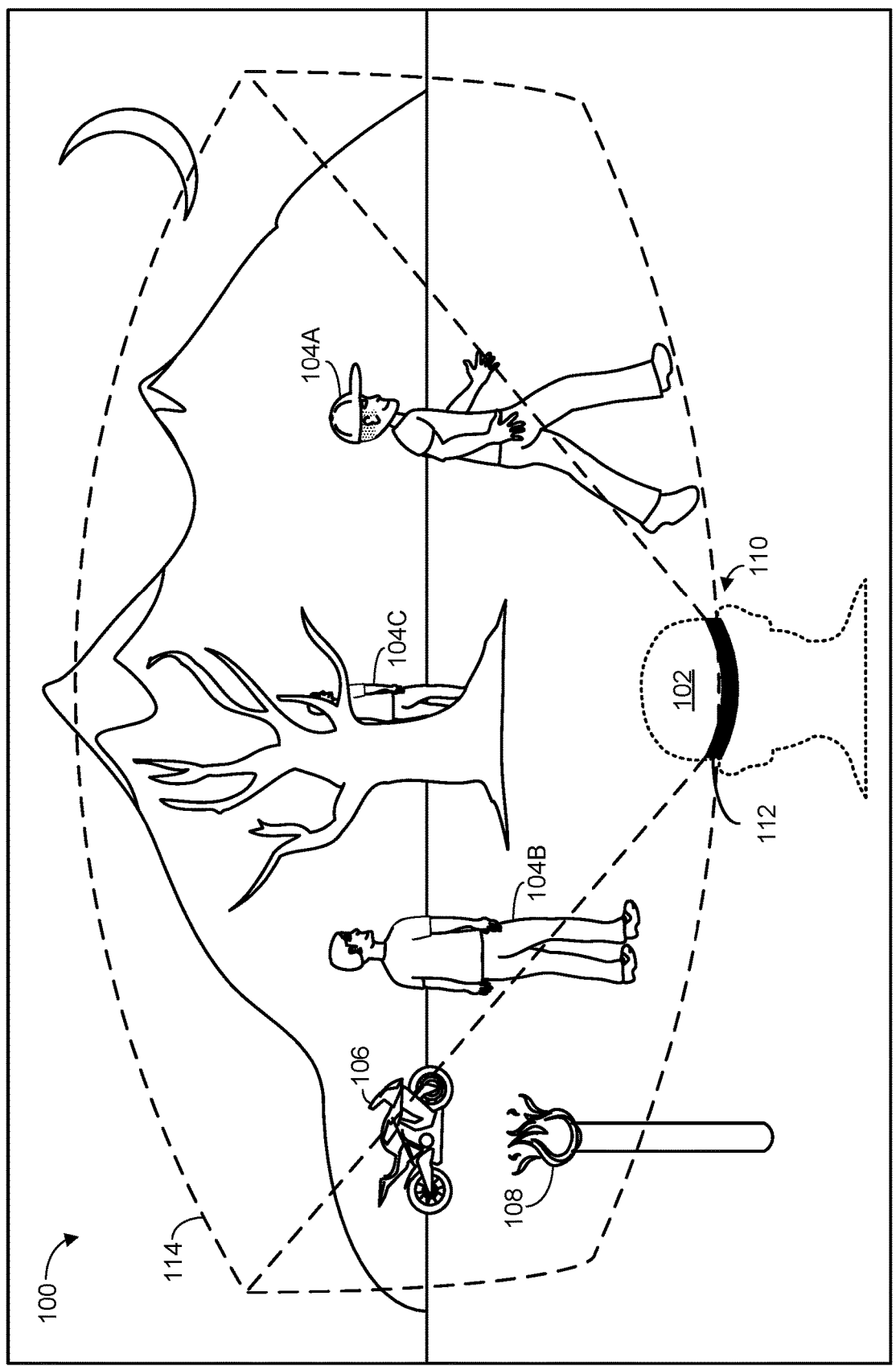
FIG. 1A schematically depicts an example real-world environment including a user equipped with a head-mounted display device (HMD).

Computing systems can be useful for facilitating low-light vision, and/or otherwise recognizing and highlighting objects in low-light environments. To illustrate this, FIG. 1A schematically depicts a real-world environment 100 in the nighttime, including a user 102. The real-world environment also includes various human subjects 104A, 104B, and 104C, along with a vehicle 106 and a heat source 108. While the heat source emits light, and therefore will likely be easily visible in the real-world environment, other objects and features in real-world environment 100 may be poorly visible, or substantially invisible, to human subject 102.

However, user 102 is equipped with a head-mounted display device (HMD) 110, including a near-eye display 112. Via the near-eye display, user 102 has a field-of-view 114, indicating an area in which virtual content presented on the near-eye display may be visible to the user. The near-eye display may be opaque, substantially blocking the user's view of the surrounding environment, or the near-eye display may be at least partially transparent. Through the use of a suitable camera, the HMD may image the real-world environment, and present display images on the near-eye display depicting the real-world environment in a manner that augments or replaces the user's own view of the environment.

In one example, the HMD may include a thermal camera configured to receive and encode thermal energy from objects in the real-world environment. Based on input from the thermal camera, the HMD may generate a thermal image, where pixel values in the thermal image correspond to relative temperature values for objects in the real-world environment imaged by the pixels. By displaying such a thermal image on the near-eye display, the HMD may enable the user to more clearly see objects in the real-world environment that would otherwise be difficult to perceive.

Figure 1B:
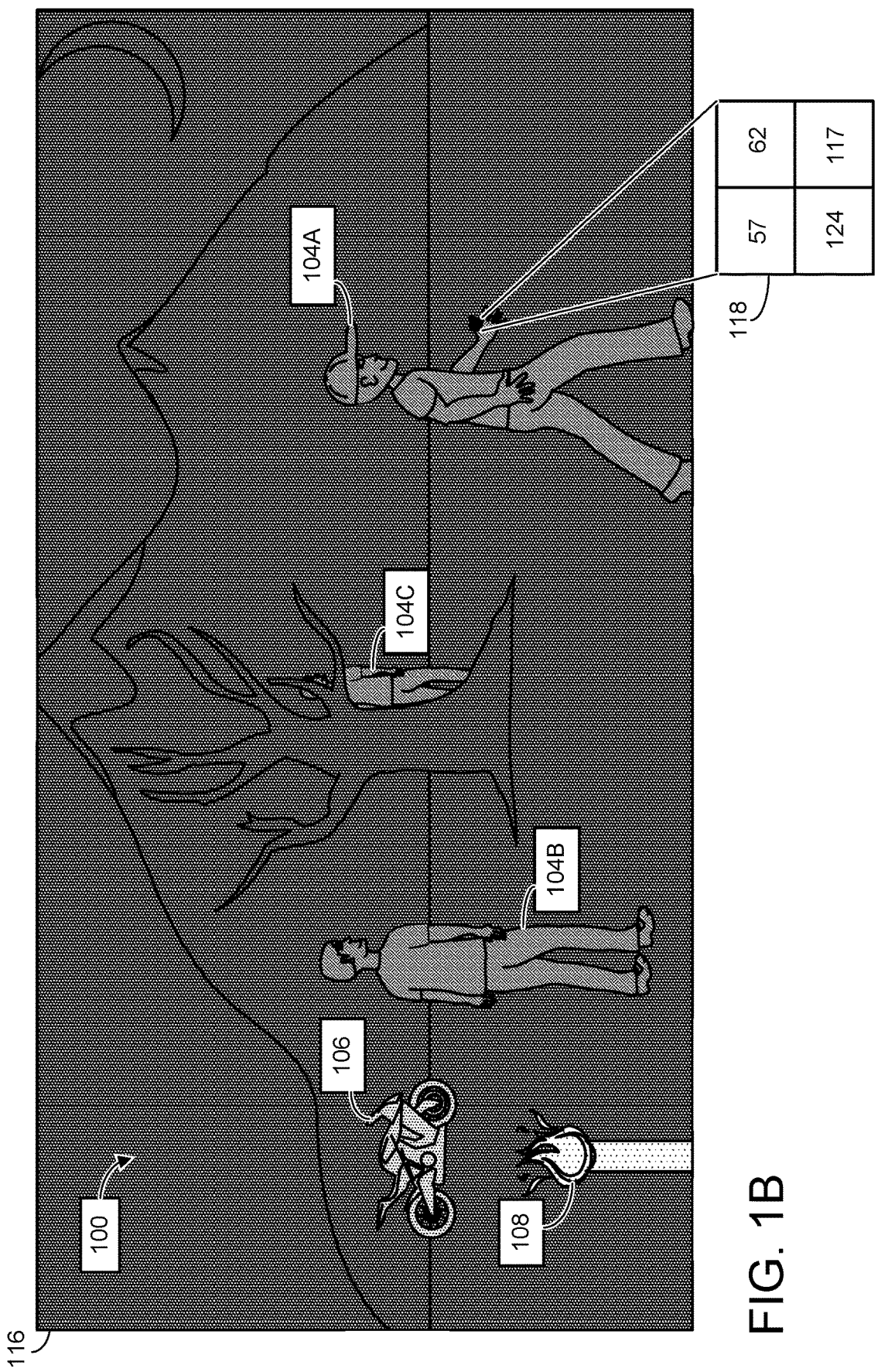
FIG. 1B schematically depicts a display image generated by the HMD of FIG. 1A.

This is illustrated in FIG. 1B, depicting a display image 116 captured by HMD 110 and presented to user 102 via near-eye display 112. In this example, the display image is a thermal image captured by a thermal camera. In other words, the pixel values of the thermal image encode the amount of thermal energy emitted by the objects in the real-world environment and received by the thermal camera. In this manner, the relative temperatures of the objects in the real-world environment may be estimated based on their corresponding pixel values in the thermal image. As shown, FIG. 1B includes pixel values 118 corresponding to four individual display pixels of display image 116. In this example, relatively higher pixel values correspond to higher relative temperature values, and are visually represented with lighter shading in the display image. In other examples, however, relative temperature values may be visually represented in display images in other suitable ways.

In general, a thermal image may take the form of any suitable data structure that encodes relative temperature values determined based on thermal energy received by the thermal camera from objects in an environment. In some cases, relative temperature values may take the form of grey-level counts, which may have any suitable value. For example, grey-level counts may be expressed as a range between 0 and 255, or a different suitable quantization may be used.

The thermal camera may in some cases be integrated into a head-mounted display device (or other computing device configured to perform functions described herein), or may alternatively be a standalone camera or a component of a separate camera system. In the example of FIG. 1B, the thermal image is a greyscale image, and objects having relatively higher temperatures are shown with lighter shading than objects having relatively lower temperatures. In practical examples, thermal images can be colorized with an artificial color gradient to make differences in relative temperature more apparent—for example, relatively cooler temperatures may be colorized in blue, while hotter temperatures may be colorized in red.

However, while such colorization is effective in drawing a user's attention to the hottest object in the environment, the hottest object may not always the most interesting or important object from the user's perspective. For example, in FIG. 1B, heat source 108 has the highest relative temperature and is therefore represented with the lightest shading. Thus, heat source 108 will likely be more easily visible to user 102 than human subjects 104A-104C and vehicle 106. However, visibility of the human subjects and vehicle may be more important to user 102 than visibility of the heat source, particularly in military or security applications, in which human subjects or vehicles can constitute a potential threat.

Accordingly, the present disclosure is directed to techniques for image colorization in which some pixels of a display image are colorized based on a recognized class of an object-of-interest that those pixels depict, such colorization being independent of the relative temperature of the object of interest. Specifically, a computing system may receive an input image, and classify a set of input interest pixels of the input image as corresponding to an object-of-interest having a recognized class. For instance, the recognized object-of-interest may be a human subject. The computing system may then generate a display image corresponding to the input image, the display image having display interest pixels corresponding to the set of input interest pixels. Prior to display, the computing system may colorize the display interest pixels with a color selected based on the recognized class of the object-of-interest. For example, pixels corresponding to detected humans may be colorized with the same color, regardless of how the temperature of the humans compares to other objects in a surrounding environment. In this manner, the low-light visibility advantages associated with thermal images may be preserved, while also visually emphasizing objects that are perceived to be more important, regardless of their temperatures.

However, it will be understood that the techniques described herein need not be applied exclusively in low-light scenarios. Rather, display image colorization may be applied in any scenario in which it may be desirable to visually emphasize one or more objects of interest, regardless of the illumination level of the scene. Furthermore, the present disclosure primarily focuses on scenarios in which the display image is a thermal image captured by a thermal camera. However, image colorization as described herein can be applied to any type of display image in which the values of individual display pixels relate to relative temperature or reflectance values of objects in the environment, even if such images are not captured by thermal cameras. Thus, in some cases, the display image may be a visible-light image, in which case the display pixels will correspond to relative reflectance values of objects in the real-world environment.

FIG. 2 illustrates an example method 200 for image colorization. Method 200 may be implemented by any suitable computing system of one or more computing devices. Such computing devices may each have any suitable hardware configuration and form factor. In some examples, method 200 may be implemented by computing system 700 described below with respect to FIG. 7.

At 202, method 200 includes receiving, from a camera, an input image including a plurality of input image pixels. This is schematically illustrated with respect to FIG. 3, showing an input image 300 that again depicts real-world environment 100. The input image may be received by any suitable camera system including one or more cameras.

Notably, as used herein, an "input image" can in some cases be the same as the "display image" that is later colorized and visually presented for display. Thus, "generating" a display image as described herein can include colorizing a captured input image, and/or performing other post-processing on the input image. In other examples, however, the display image may be different from the input image, and may be captured by a different camera. Thus, "generating" the display image can include capturing the display image, similar to the input image. For example, the input image may be a visible-light image, while the display image may be generated based output from a camera sensitive to non-visible wavelengths of light. As discussed above, the display image can be a thermal image captured by a thermal camera, in which case the non-visible wavelengths of light may include infrared (IR) light. Thus, in various examples, the input image may be a visible-light image while the display image is a thermal image, or the input image could be a thermal image while the display image is a visible-light image. In some cases, both the input and display images could be thermal images, or visible-light images. In cases where the input and display images are different, image registration may be performed to align the input and display images—e.g., to alleviate any parallax effect caused by physical separation of the cameras capturing the input and display images.

Figure 4:
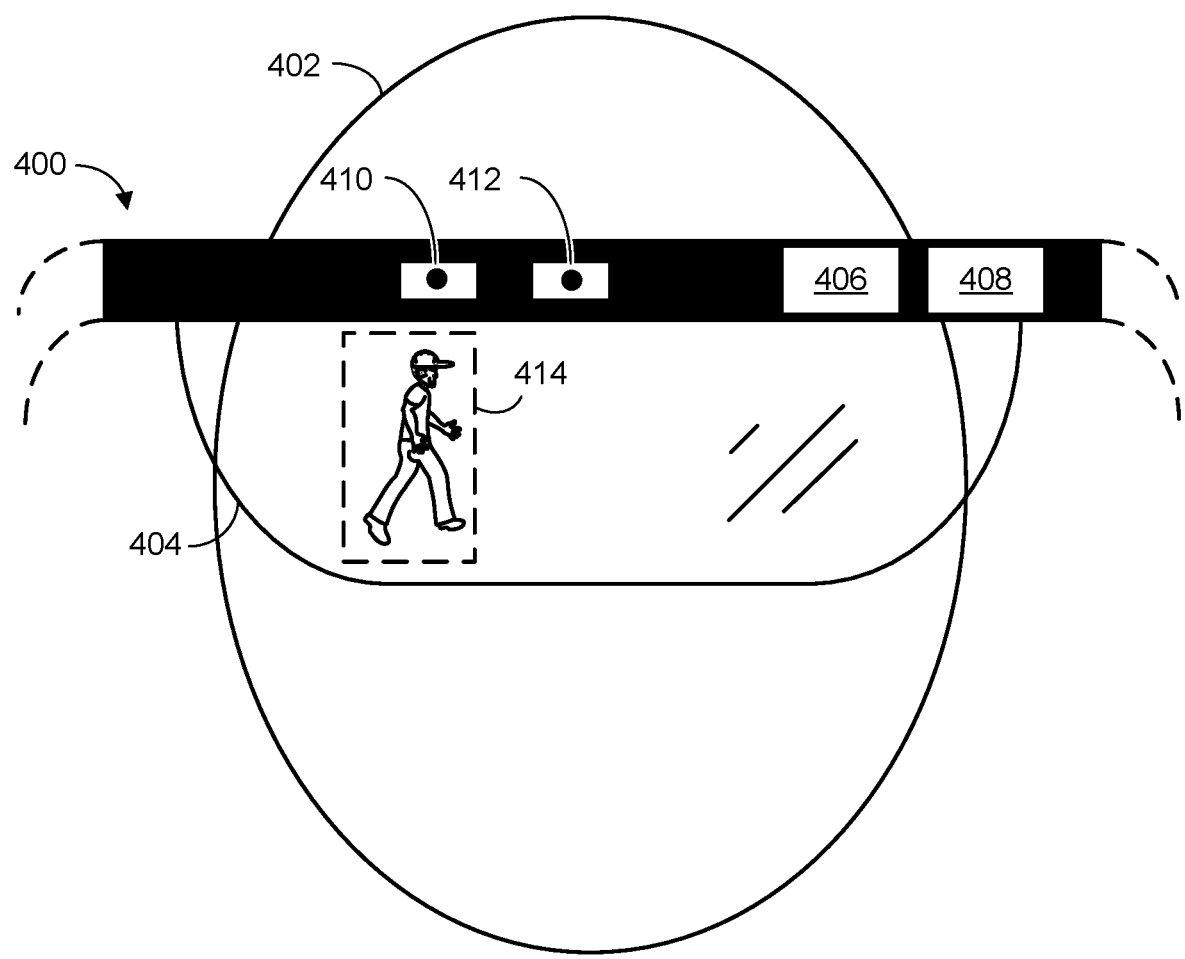
FIG. 4 schematically depicts an example HMD.

In any case, however, both the input and display images may be captured by any suitable camera(s). The camera(s) used to capture the input and display images may be integrated within, or external to but communicatively coupled with, the computing device that implements method 200. This is illustrated in FIG. 4, which schematically depicts a head-mounted display device 400 being worn on a user head 402. Head-mounted display device 400 includes a near-eye display 402 configured to display virtual images to the user's eyes. As noted above, the near-eye display may in some cases be opaque, substantially blocking the user's view of their surrounding environment, or the near-eye display may be at least partially transparent. Virtual images displayed on a near-eye display may take any suitable form, and may be provided as part of virtual and/or augmented reality experiences. In some cases, a near-eye display may be used to present a colorized display image, as will be described in more detail below.

Head-mounted display device 400 includes a storage subsystem 406 that may hold instructions executable by a logic subsystem 408 to perform one or more steps of method 200, and/or any other suitable computer functions. Additional details with respect to the storage subsystem and logic subsystem are described below with respect to FIG. 7.

Head-mounted display device 400 also includes two cameras 410 and 412. In one example, camera 410 may be a visible-light camera, while camera 412 may be a thermal camera. For instance, camera 410 may capture a visible-light input image, while camera 412 captures a thermal display image. Alternatively, in cases where the input image and the display image are the same, the image may be captured by one camera—e.g., camera 412. In general, computing devices described herein may include any suitable collection of cameras, and capture of input and display images may be distributed between the collection of cameras in any suitable way. Output from either or both of the cameras may be displayed on near-eye display 404 of HMD 400. As shown, near-eye display 404 is presenting visual content 414, which may be part of a colorized display image as will be described in more detail below.

In general, a "thermal camera" may include any imaging system configured to receive and encode thermal energy (e.g., infrared light) from objects in an environment. A thermal camera may typically be sensitive to light in the 8-14 μm range—e.g., corresponding to blackbody radiation emitted by objects in an environment. The amount of radiation emitted by any particular object may be dependent on the object's emissivity (or the relative power of a surface to radiate heat). In some examples, a thermal camera may include a radiometric lens disposed before other optical elements of the thermal camera.

Regardless of the nature of the input image, and regardless of the type of camera used to capture the input image, the input image may be analyzed to detect an object of interest. Thus, returning briefly to FIG. 2, method 200 includes, at 204, classifying one or more of the plurality of input image pixels as a set of input interest pixels corresponding to an object of interest via a machine-learning trained classifier. "Input interest pixels" refer to any pixels of the input image identified by the classifier as depicting an object of interest. The set of input interest pixels may be defined in any suitable way—e.g., as a grid of pixels defining a bounding box that encloses the object of interest, or an irregular blob of pixels identified as depicting the object of interest.

Identification of objects of interest is schematically illustrated with respect to FIG. 3. As shown, a machine-learning trained classifier 302 is applied to input image 300 to classify input image pixels of the input image as a set of input interest pixels corresponding to an object of interest. Specifically, the classified input interest pixels are those depicting human subject 104A—the object of interest in this example—and the recognized class 306 of the object of interest includes humans.

In some cases, more than one object of interest may be identified in the same input image. In other words, the machine-learning trained classifier may classify one or more image pixels as a second set of input interest pixels corresponding to a second object of interest, which may have the same recognized class as the first object of interest, or a different recognized class. In the example of FIG. 3, the machine-learning trained classifier classifies additional image pixels of the input image as additional sets of input interest pixels. Specifically, human subject 104B is also classified as an object of interest, having the same recognized class 306 as human subject 104A. Vehicle 106 is classified as another object of interest, having a different recognized class 304 that includes vehicles. Notably, in this example, pixels corresponding to human subject 104C are not classified as corresponding to an object of interest, due to the fact that the human subject is partially occluded by a tree and thus is more difficult for the machine-learning trained classifier to recognize.

It will be understood that the recognized classes discussed above, corresponding to humans and vehicles, are non-limiting examples. In other implementations, additional or alternative objects of interest having additional or alternative classes may be detected. As additional examples, recognized classes can include buildings, roads, plants, weapon systems, etc. Furthermore, a "recognized class" can have any suitable granularity. To illustrate this, the non-limiting example of a "vehicle" class can correspond to a large number of different objects. While FIG. 3 depicts a motorcycle as an example of a vehicle, other "vehicles" can include passenger cars, trucks, bicycles, airplanes, tanks, etc. Thus, in practical examples, "recognized classes" can be either more specific, or broader, than the classes described herein.

Any suitable machine learning and/or artificial intelligence technologies may be used to implement the machine-learning trained classifier. Examples of suitable machine learning and/or artificial intelligence technologies are described below with respect to FIG. 7. In general, the machine-learning trained classifier may take the form of a suitable software module that receives one or more images as input data, and identifies sets of pixels within the one or more images as corresponding to one or more objects of interest. In various examples, different machine-learning trained classifiers may be used to recognize objects of interest having different classes, and/or may be applied to input images of different types. Furthermore, the present disclosure primarily assumes that the machine-learning trained classifier will be applied to the input image. In cases where the input image and display image are different—e.g., the input image is a visible-light image, and the display image is a thermal image—then detection of objects of interest may be improved when one or more machine-learning classifiers are applied to both the input and display images. In other words, use of thermal image data in tandem with visible-light image data may improve detection of objects of interest as compared to using only one image type.

Returning briefly to FIG. 2, at 206, method 200 includes generating a display image including a plurality of display image pixels corresponding to the plurality of input image pixels. As discussed above, "generating" a display image can include capturing a display image—e.g., using a thermal camera—or receiving a display image from another source, such as an external camera. Generating a display image can also include processing an input image. In cases where the input image and display image are the same, the display image is generated when the input image is captured. Image 116 of FIG. 1B is one example of a display image, and corresponds to input image 300 of FIG. 3. As described above, each of the plurality of display image pixels have pixel values determined based on relative temperature values of the objects in the real-world environment imaged by the display pixels. In FIG. 1B, example pixel values 118 are given for four display image pixels of the display image.

In cases where the input image and display image are the same image, then the display image pixels will inherently be the same as the input image pixels. However, in cases where the input image and display image are different, the plurality of display image pixels still correspond to the plurality of input image pixels, such that the display image pixels include one or more sets of display interest pixels corresponding to any sets of input interest pixels identified in the input image. In other words, the computing system determines or maintains a mapping that associates each individual input image pixel with a display image pixel that depicts the same portion of the real-world environment.

Figure 5:
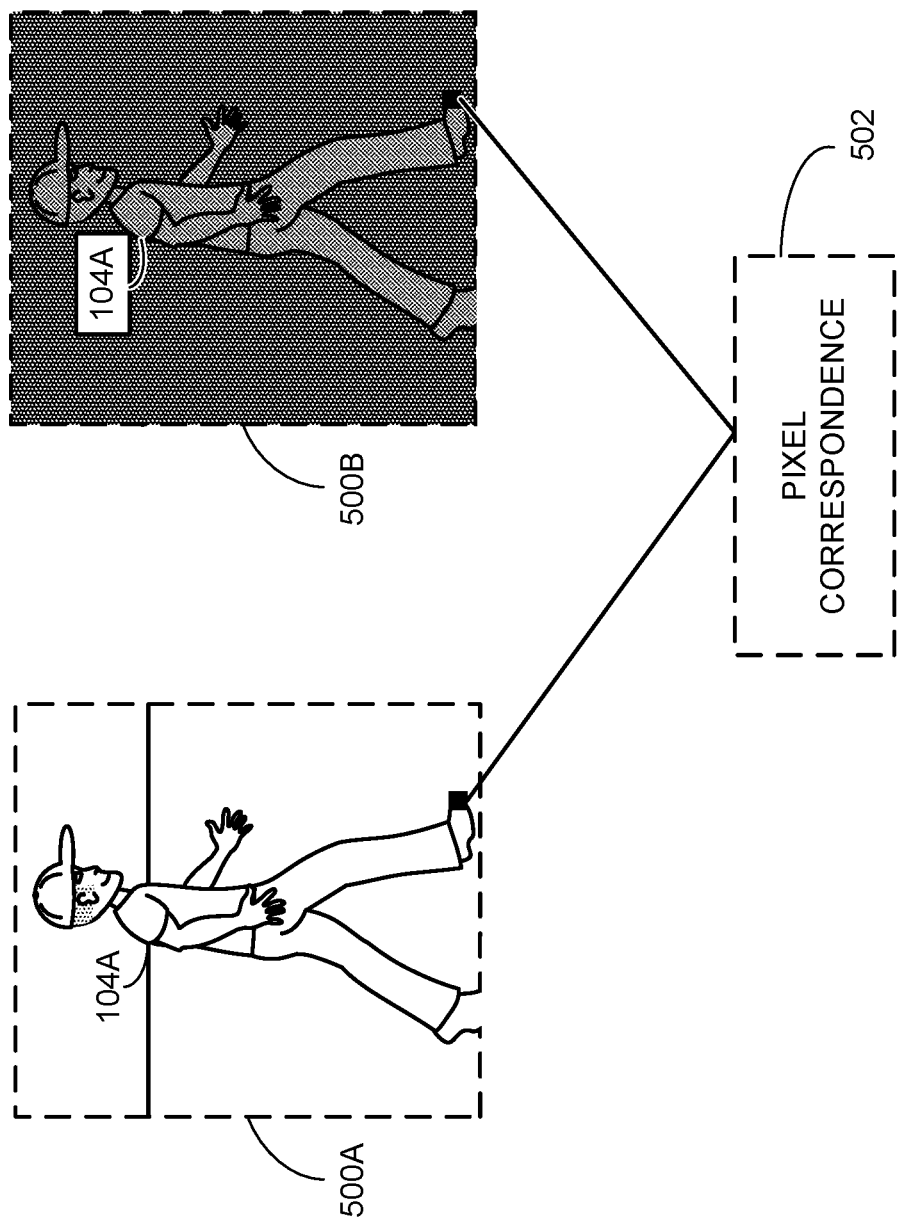
FIG. 5 schematically shows pixel correspondences between portions of an input image and display image.

This is schematically illustrated with respect to FIG. 5. Specifically, FIG. 5 reproduces a portion 500A of input image 300, along with a corresponding portion 500B of display image 116, each depicting human subject 104A. The computing device identifies a plurality of pixel-to-pixel correspondences 502 between image portions 500A and 500B. Such correspondences may be identified in any suitable way. As discussed above, the input image and display image may be captured by separate cameras (e.g., cameras 410 and 412), which may have different positions and perspectives. In such cases, image registration may be performed to align the two images and alleviate any parallax effect caused by displacement of the two cameras. For example, when the relative positions and perspectives of the two cameras are known, pixels of images captured by each camera may be projected into a common frame of reference—e.g., relative to a virtual camera. In this manner, it may be determined which pixels of one image (e.g., image 300) correspond to the same real-world features as the other image (e.g., image 116). Given this, the computing device can determine which pixels of the display image are display interest pixels, corresponding to input interest pixels of the input image. and depicting an object of interest.

Returning briefly to FIG. 2, at 208, method 200 includes colorizing the set of display interest pixels with a color selected based on a recognized class of the object of interest to give a colorized display image. Notably, the selected color is independent of the relative temperature values of the object of interest given by the pixel values of the display interest pixels.

Figure 6:
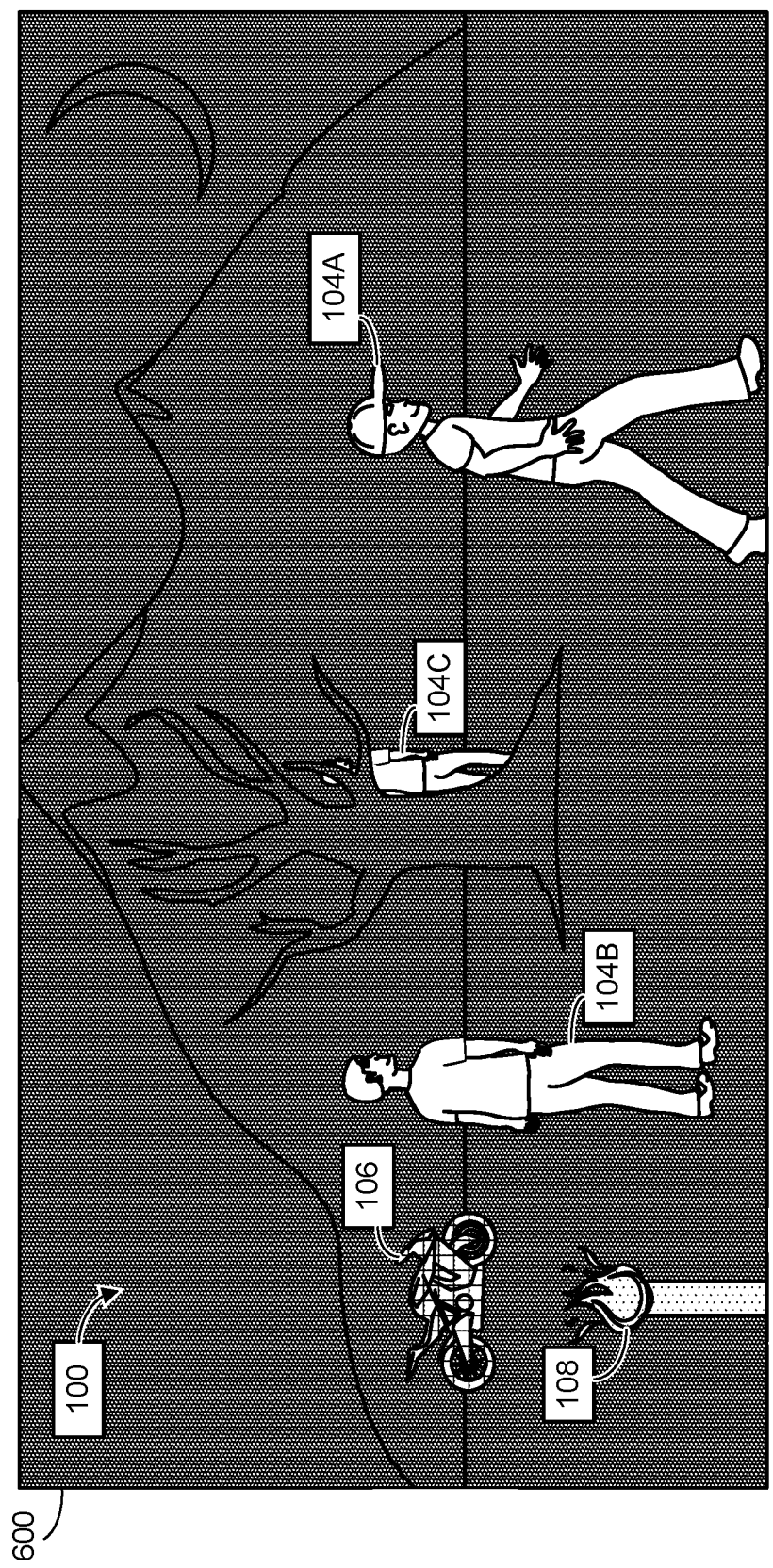
FIG. 6 schematically depicts an example colorized display image.

This is illustrated in FIG. 6, showing an example colorized display image 600. Specifically, image 600 is a colorized version of display image 116 of FIG. 6. After colorization, human subject 104A is now shown in white, whereas prior to colorization the human subject was represented using a greyscale fill pattern based on the relative temperature of the human subject compared to other objects in the real-world environment. In other words, the color of the human subject is now independent of its relative temperature values, as given by the original non-colorized display image pixels. Given that FIG. 6 is a greyscale drawing, white is used to indicate colorization of the object of interest, which in this case is human subject 104A. In practical examples, however, objects of interest may be colorized using any suitable colors—e.g., red, yellow, green, blue, or any other visible color. In some cases, bright or contrasting colors may beneficially be used, to increase visibility of the object of interest as compared to the rest of the image.

In FIG. 6, substantially all of the display image pixels depicting the object of interest are colorized. It will be understood, however, that this need not be the case. Rather, in other examples, only a portion of the object of interest may be colorized, or colorization may extend beyond the pixels depicting the object of interest. For example, the computing system may generate a bounding box that encloses the object of interest, and colorize all of the display pixels falling within the bounding box.

Notably, while human subject 104A is colorized in display image 600, other elements of the display image are not colorized. In particular, heat source 108 is still shown with a light fill pattern indicating its relatively high temperature as compared to other objects in the real-world environment. Similarly, the ground, tree, sky, and background mountain are still shown using the same relatively darker fill pattern as in the non-colorized display image. Thus, the colorized display image still conveys information regarding the relative temperature values of objects in the real-world environment, while drawing more attention to objects of interest that are identified as being potentially more relevant or important to a human observer.

Thus far, the present disclosure has only described colorization of a single object of interest—human subject 104A. However, colorization may be applied to any and all objects of interest identified in an input image. In other words, in addition to colorization of a first set of display interest pixels corresponding to a first object of interest, the computing system may colorize a second set of display interest pixels corresponding to a second object of interest, as well as any other display interest pixels corresponding to other objects of interest. The specific colors used to colorize these other objects of interest may be selected based on the recognized classes of the objects of interest, and may be independent of the relative temperature values of the objects of interest, as discussed above.

To this end, human subject 104B and vehicle 106 are also colorized in display image 106. Because human subject 104B has the same recognized class as the first object of interest (i.e., human subject 104A), subject 104B is also shown in white to indicate that it is colorized with the same selected color. By contrast, vehicle 106 has a different recognized class, and thus is colorized with a different selected color—represented in FIG. 6 with a checkerboard fill pattern. Again, given that FIG. 6 is a greyscale drawing, greyscale fill patterns are used to represent different colors. In practical examples, however, any suitable colors may be used.

The present disclosure has thus far focused on colorization of objects of interest identified by a machine-learning trained classifier, which identifies input interest pixels in an input image. In some examples, however, the computing system may colorize objects of interest not identified by the machine-learning trained classifier, based on their similarity to other objects of interest that are identified by the classifier.

To illustrate this, input image 300 of FIG. 3 depicts a human subject 104C that, unlike human subjects 104A and 104B, is not identified by machine-learning trained classifier 302 as corresponding to recognized class 306. This is due to the fact that human subject 104C is partially occluded by a tree, interfering with the classifier's recognition of the subject as being human. However, in display image 116 of FIG. 1B, human subject 104C is shown with the same greyscale fill pattern as human subjects 104A and 104B, given that each of the human subjects have similar relative temperature values. By operating under the assumption that objects having similar relative temperature values are likely to correspond to the same recognized class, the computing system may identify human subject 104C as another object of interest, even though the subject is partially occluded. In other words, the computing system may identify a second set of display interest pixels (e.g., depicting human subject 104C) having relative temperature values within a threshold similarity of the first set of display interest pixels (e.g., depicting human subject 104A) as corresponding to a second object of interest. The newly-identified display interest pixels may then be colorized appropriately—e.g., in FIG. 6, display interest pixels corresponding to human subject 104C are colorized in white, as with pixels depicting human subjects 104A and 104B.

Any suitable similarity threshold may be used—as one example, the computing system may use a 90% similarity threshold. Furthermore, in some cases, the computing system may consider information beyond thermal similarity before identifying new objects of interest not identified by the machine-learning trained classifier. As examples, the computing system may consider the size and/or shape of a patch of display pixels. In other words, if a patch of display pixels has a high thermal similarity with an already-identified object of interest, but a significantly different size and/or shape, the patch of display pixels under consideration may be relatively unlikely to correspond to an object of interest of the same recognized class. By contrast, if the size and/or shape are relatively more similar, then a match may be relatively more likely.

In some cases, after identifying a second object of interest based on thermal similarity to a first object of interest, the second set of display interest pixels corresponding to the second object of interest may be used for retraining the machine-learning trained classifier. In general, machine-learning trained classifiers may be trained on sets of training data using supervised or unsupervised learning. Thus, the second set of display interest pixels may be added to a set of training data used to train the machine-learning trained classifier, such that the classifier will be more likely to identify similar objects of interest in the future without relying on thermal similarity.

Though the present disclosure has thus far focused on single images, it will be understood that input images and/or display images may in some cases be single image frames of corresponding input and/or display video streams. Such video streams may have any suitable framerate. Furthermore, in cases where the input image is an individual frame of an input video stream, the techniques described herein can in some cases be beneficially used to reduce the frequency with which a machine-learning trained classifier is applied to input images. In general, running machine learning classifiers tends to be a resource-intensive process, both in terms of computational power and electrical power. Thus, the overall efficiency of the computing system may be improved when the classification frequency is reduced. As such, the machine-learning trained classifier may be applied to fewer than all frames of the input video stream, such that the input video stream includes non-classified input image frames.

While it can be challenging to track and appropriately colorize objects of interest in display image frames corresponding to non-classified input image frames (in cases where the input and display images are different), such tracking can be achieved through use of thermal similarity as described above. In other words, a position of an object of interest can be tracked during non-classified input image frames by identifying, in subsequent display image frames, sets of display image pixels having a shape, position, and range of relative temperature values consistent with the object of interest. Again, any suitable similarity threshold may be used in evaluating whether the size, shape, position, and/or range of relative temperature values is "consistent" with a previously-identified object of interest, such as a 90% similarity threshold. In this manner, the classification frequency may be reduced while still enabling the colorization of objects of interest as described above.

The present disclosure has thus far focused on input images in which pixel values of the input image pixels encode relative temperature values—as opposed to absolute temperature values—for objects in the real-world environment. It will be understood, however, that the techniques described herein may be applied in scenarios where the absolute temperature values—e.g., in terms of degrees Celsius or Fahrenheit—are known.

Furthermore, in some cases, identification of objects of interest as described herein can be used to calibrate relative temperature values of objects in a real-world environment, to provide more information regarding the absolute temperature values for the objects. For example, based on relative temperature values of an object of interest, as given by pixel values of display image pixels depicting the object of interest, the computing system may identify an average relative temperature value for the object. Such an average may be calculated in any suitable way—e.g., by summing pixel values of the display interest pixels corresponding to the object of interest and dividing by the total number of display interest pixels. The computing system may then compare the average relative temperature value for the object of interest to a known absolute temperature associated with the recognized class of the object of interest to determine an approximate correspondence, or calibration, between relative temperature values and absolute temperature values.

To illustrate this, the object of interest may be identified as a human—e.g., human subject 104A—having an example average relative temperature value of 100. A typical human has an average skin temperature of approximately 33° C. From this, the computing system may determine that a relative temperature value of 100 roughly corresponds to an absolute temperature value of 33° C. While additional data points may in some cases be necessary to provide a robust or precise relative-to-absolute temperature calibration, the computing system may nonetheless have more information regarding the approximate absolute temperatures of objects in the real-world environment than would otherwise be available if the object of interest had not been identified. In other words, the estimated absolute temperature of the object of interest can be used as a baseline for estimating absolute temperatures of other objects in the environment, thereby calibrating relative temperature values for the other objects. This may be particularly effective in cases where the approximate sensitivity of the thermal camera is known.

Returning briefly to FIG. 2, at 210, method 200 includes displaying the colorized display image, with the set of display interest pixels colorized with the selected color. The colorized display image may be displayed on any suitable display. As one example, the colorized display image may be displayed on a transparent or opaque near-eye display of a head-mounted display device, such as near-eye display 404 of HMD 400. As additional non-limiting examples, the colorized display image may be displayed on a computer monitor, television, smartphone display, or vehicle heads-up display.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
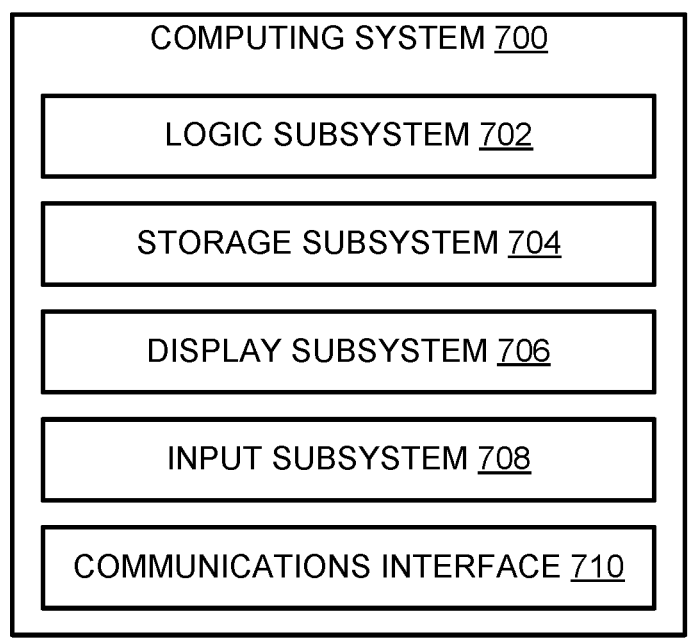
FIG. 7 schematically shows an example computing system.

FIG. 7 schematically shows a simplified representation of a computing system 700 configured to provide any to all of the compute functionality described herein. Specifically, computing system 700 may be useable to colorize display interest pixels corresponding to objects of interest to give colorized display images, as discussed above. Computing system 700 may take the form of one or more personal computers, network-accessible server computers, tablet computers, home-entertainment computers, gaming devices, mobile computing devices, mobile communication devices (e.g., smartphone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. In particular, ML and/or AI techniques may be used to identify input interest pixels corresponding to an object of interest, as discussed above. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for image colorization comprises: receiving, from a camera, an input image including a plurality of input image pixels; classifying, via a machine-learning trained classifier, one or more of the plurality of input image pixels as a set of input interest pixels corresponding to an object of interest; generating a display image including a plurality of display image pixels corresponding to the plurality of input image pixels, each of the plurality of display image pixels having pixel values determined based on relative temperature or reflectance values of objects in a real-world environment imaged by the display image pixels, the plurality of display image pixels including a set of display interest pixels corresponding to the set of input interest pixels; colorizing the set of display interest pixels with a color selected based on a recognized class of the object of interest to give a colorized display image, the selected color being independent of the relative temperature or reflectance values of the object of interest given by the pixel values of the display interest pixels; and displaying the colorized display image with the set of display interest pixels colorized with the selected color. In this example or any other example, the method further comprises classifying one or more of the plurality of input image pixels as a second set of input interest pixels corresponding to a second object of interest having a same recognized class as the object of interest, and colorizing a second set of display interest pixels corresponding to the second set of input interest pixels with the color selected based on the recognized class of the object of interest. In this example or any other example, the method further comprises classifying one or more of the plurality of input image pixels as a second set of input interest pixels corresponding to a second object of interest having a different recognized class from the object of interest, and colorizing a second set of display interest pixels corresponding to the second set of input interest pixels with a second color selected based on the different recognized class of the second object of interest. In this example or any other example, the display image is different from the input image and is captured by a second camera. In this example or any other example, the input image is a thermal image and the display image is a visible-light image. In this example or any other example, the input image is a visible-light image and the display image is a thermal image. In this example or any other example, the method further comprises identifying an average relative temperature value for the object of interest based on pixel values of the set of display interest pixels. In this example or any other example, the set of display interest pixels are a first set of display interest pixels, and the method further comprises: identifying a second set of display interest pixels in the plurality of display image pixels having relative temperature values within a threshold similarity of the first set of display interest pixels as corresponding to a second object of interest; and colorizing the second set of display interest pixels corresponding to the second object of interest with the color selected based on the recognized class of the object of interest. In this example or any other example, the method further comprises retraining the machine-learning trained classifier using the second set of display interest pixels as input training data. In this example or any other example, the method further comprises calibrating relative temperature values for the objects in the real-world environment by comparing the average relative temperature value for the object of interest to a known absolute temperature associated with the recognized class of the object of interest. In this example or any other example, the input image is an individual frame of an input video stream, and wherein the machine-learning classifier is applied to fewer than all frames of the input video stream, such that the input video stream includes non-classified input image frames. In this example or any other example, a position of the object of interest is tracked during non-classified input image frames by identifying, in subsequent display image frames, sets of display image pixels having a shape, position, and range of relative temperature values consistent with the object of interest. In this example or any other example, the recognized class of the object of interest includes humans. In this example or any other example, the recognized class of the object of interest includes vehicles. In this example or any other example, the colorized display image is displayed by a head-mounted display device (HMD).

In an example, a computing system comprises: a logic machine; and a storage machine holding instructions executable by the logic machine to: receive, from a camera, an input image including a plurality of input image pixels; classify, via a machine-learning trained classifier, one or more of the plurality of input image pixels as a set of input interest pixels corresponding to an object of interest; generate a display image including a plurality of display image pixels corresponding to the plurality of input image pixels, each of the plurality of display image pixels having pixel values determined based on relative temperature or reflectance values of objects in a real-world environment imaged by the display image pixels, the plurality of display image pixels including a set of display interest pixels corresponding to the set of input interest pixels; colorize the set of display interest pixels with a color selected based on a recognized class of the object of interest to give a colorized display image, the selected color being independent of the relative temperature or reflectance values of the object of interest given by the pixel values of the display interest pixels; and display the colorized display image with the set of display interest pixels colorized with the selected color. In this example or any other example, the instructions are further executable to classify one or more of the plurality of input image pixels as a second set of input interest pixels corresponding to a second object of interest having a different recognized class from the object of interest, and colorize a second set of display interest pixels corresponding to the second set of input interest pixels with a second color selected based on the different recognized class of the second object of interest. In this example or any other example, the display image is a thermal image captured by a thermal camera. In this example or any other example, the set of display interest pixels are a first set of display interest pixels, and the instructions are further executable to: identify a second set of display interest pixels in the plurality of display image pixels having relative temperature values within a threshold similarity of the first set of display interest pixels as corresponding to a second object of interest; and colorize the second set of display interest pixels corresponding to the second object of interest with the color selected based on the recognized class of the object of interest.

In an example, a head-mounted display device comprises: a near-eye display; a thermal camera; a logic machine; and a storage machine holding instructions executable by the logic machine to: receive, from the thermal camera, a thermal image including a plurality of thermal image pixels having pixel values corresponding to relative temperature values of objects in a real-world environment imaged by the thermal image pixels; classify, via a machine-learning trained classifier, one or more of the plurality of thermal image pixels as a set of thermal interest pixels corresponding to an object of interest; colorize the set of thermal interest pixels with a color selected based on a recognized class of the object of interest to give a colorized thermal image, the selected color being independent of the relative temperature values of the object of interest given by the pixel values of the thermal interest pixels; and display, via the near-eye display, the colorized thermal image with the set of thermal interest pixels colorized with the selected color.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for image colorization, comprising:
receiving, from a camera, an input image including a plurality of input image pixels;
classifying, via a machine-learning trained classifier, one or more of the plurality of input image pixels as a set of input interest pixels corresponding to an object of interest;
generating a display image including a plurality of display image pixels corresponding to the plurality of input image pixels, each of the plurality of display image pixels having pixel values determined based on relative temperature values of objects in a real-world environment imaged by the display image pixels, the plurality of display image pixels including a set of display interest pixels corresponding to the set of input interest pixels;
colorizing the set of display interest pixels with a color selected based on a recognized class of the object of interest to give a colorized display image, the selected color being independent of the relative temperature values of the object of interest given by the pixel values of the display interest pixels; and
displaying the colorized display image with the set of display interest pixels colorized with the selected color.

2. The method of claim 1, further comprising classifying one or more of the plurality of input image pixels as a second set of input interest pixels corresponding to a second object of interest having a same recognized class as the object of interest, and colorizing a second set of display interest pixels corresponding to the second set of input interest pixels with the color selected based on the recognized class of the object of interest.

3. The method of claim 1, further comprising classifying one or more of the plurality of input image pixels as a second set of input interest pixels corresponding to a second object of interest having a different recognized class from the object of interest, and colorizing a second set of display interest pixels corresponding to the second set of input interest pixels with a second color selected based on the different recognized class of the second object of interest.

4. The method of claim 1, wherein the display image is different from the input image and is captured by a second camera.

5. The method of claim 4, wherein the input image is a thermal image and the display image is a visible-light image.

6. The method of claim 4, wherein the input image is a visible-light image and the display image is a thermal image.

7. The method of claim 6, further comprising identifying an average relative temperature value for the object of interest based on pixel values of the set of display interest pixels.

8. The method of claim 7, wherein the set of display interest pixels are a first set of display interest pixels, and the method further comprises:
- identifying a second set of display interest pixels in the plurality of display image pixels having relative temperature values within a threshold similarity of the first set of display interest pixels as corresponding to a second object of interest; and
- colorizing the second set of display interest pixels corresponding to the second object of interest with the color selected based on the recognized class of the object of interest.

9. The method of claim 8, further comprising retraining the machine-learning trained classifier using the second set of display interest pixels as input training data.

10. The method of claim 7, further comprising calibrating relative temperature values for the objects in the real-world environment by comparing the average relative temperature value for the object of interest to a known absolute temperature associated with the recognized class of the object of interest.

11. The method of claim 1, wherein the input image is an individual frame of an input video stream, and wherein the machine-learning classifier is applied to fewer than all frames of the input video stream, such that the input video stream includes non-classified input image frames.

12. The method of claim 11, wherein a position of the object of interest is tracked during non-classified input image frames by identifying, in subsequent display image frames, sets of display image pixels having a shape, position, and range of relative temperature values consistent with the object of interest.

13. The method of claim 1, wherein the recognized class of the object of interest includes humans.

14. The method of claim 1, wherein the recognized class of the object of interest includes vehicles.

15. The method of claim 1, wherein the colorized display image is displayed by a head-mounted display device (HMD).

16. A computing system, comprising:
- a logic machine; and
- a storage machine holding instructions executable by the logic machine to:
  - receive, from a camera, an input image including a plurality of input image pixels;
  - classify, via a machine-learning trained classifier, one or more of the plurality of input image pixels as a set of input interest pixels corresponding to an object of interest;
  - generate a display image including a plurality of display image pixels corresponding to the plurality of input image pixels, each of the plurality of display image pixels having pixel values determined based on relative temperature values of objects in a real-world environment imaged by the display image pixels, the plurality of display image pixels including a set of display interest pixels corresponding to the set of input interest pixels;
  - colorize the set of display interest pixels with a color selected based on a recognized class of the object of interest to give a colorized display image, the selected color being independent of the relative temperature values of the object of interest given by the pixel values of the display interest pixels; and
  - display the colorized display image with the set of display interest pixels colorized with the selected color.

17. The system of claim 16, wherein the instructions are further executable to classify one or more of the plurality of input image pixels as a second set of input interest pixels corresponding to a second object of interest having a different recognized class from the object of interest, and colorize a second set of display interest pixels corresponding to the second set of input interest pixels with a second color selected based on the different recognized class of the second object of interest.

18. The system of claim 16, wherein the display image is a thermal image captured by a thermal camera.

19. The system of claim 16, wherein the set of display interest pixels are a first set of display interest pixels, and the instructions are further executable to:
- identify a second set of display interest pixels in the plurality of display image pixels having relative temperature values within a threshold similarity of the first set of display interest pixels as corresponding to a second object of interest; and
- colorize the second set of display interest pixels corresponding to the second object of interest with the color selected based on the recognized class of the object of interest.

20. A head-mounted display device, comprising:
- a near-eye display;
- a thermal camera;
- a logic machine; and
- a storage machine holding instructions executable by the logic machine to:
  - receive, from the thermal camera, a thermal image including a plurality of thermal image pixels having pixel values corresponding to relative temperature values of objects in a real-world environment imaged by the thermal image pixels;
  - classify, via a machine-learning trained classifier, one or more of the plurality of thermal image pixels as a set of thermal interest pixels corresponding to an object of interest;
  - colorize the set of thermal interest pixels with a color selected based on a recognized class of the object of interest to give a colorized thermal image, the selected color being independent of the relative temperature values of the object of interest given by the pixel values of the thermal interest pixels; and
  - display, via the near-eye display, the colorized thermal image with the set of thermal interest pixels colorized with the selected color.

* * * * *